April 20, 1926.

W. P. THOMAS

GRADING MACHINE

Filed July 18, 1925

INVENTOR
Wilson P. Thomas
By J. W. Ellis
ATTORNEY

April 20, 1926.

W. P. THOMAS

GRADING MACHINE

Filed July 18, 1925

INVENTOR
Wilson P. Thomas
BY
ATTORNEY

Patented Apr. 20, 1926.

1,581,247

UNITED STATES PATENT OFFICE.

WION P. THOMAS, OF CARLTON, NEW YORK.

GRADING MACHINE.

Application filed July 18, 1925. Serial No. 44,592.

*To all whom it may concern:*

Be it known that I, WION P. THOMAS, a citizen of the United States of America, and a resident of the town of Carlton, county of Orleans, and State of New York, have invented certain new and useful Improvements in Grading Machines, of which the following is a full, clear, and exact description.

My invention relates generally to grading machines and more particularly to machines for grading apples and other fruit, as well as vegetables such as potatoes and the like, or any other objects.

One of the objects of my invention has been to provide a machine which shall be very compact in design, thus occupying a minimum amount of floor space.

Another object has been to provide a device which shall accurately and efficiently grade fruit.

Moreover, my device is so designed that it may be easily and conveniently operated, and requires such small amount of power that even a child may operate it.

Furthermore, my device is so designed that the fruit being graded will not be injured, and the ejector means are so arranged and designed that crushing and mutilating of the fruit can not occur.

The above objects and advantages have been accomplished by the device shown in the accompanying drawings, of which:

Figure 1:
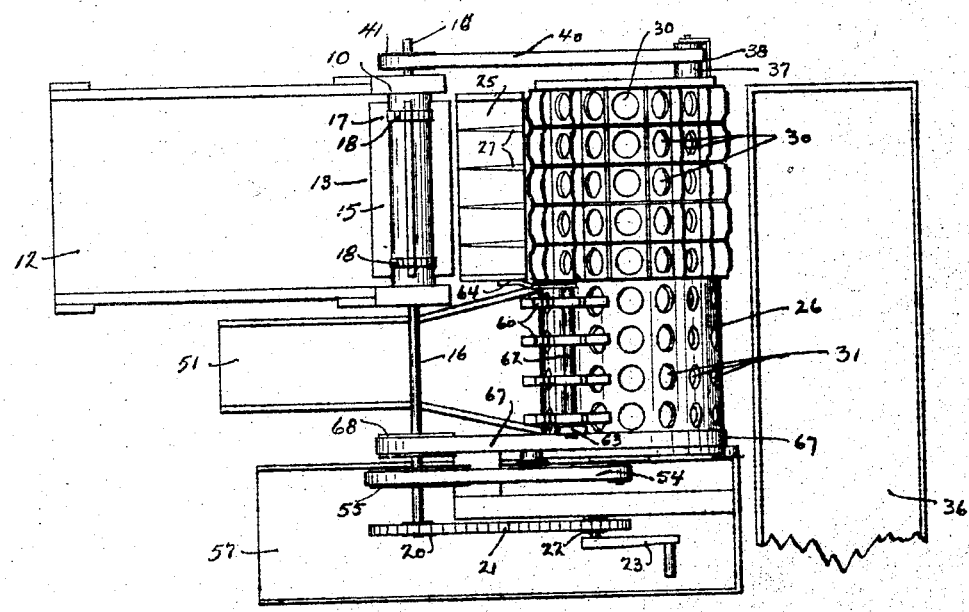
Fig. 1 is a plan view of my complete device.
Figure 2:
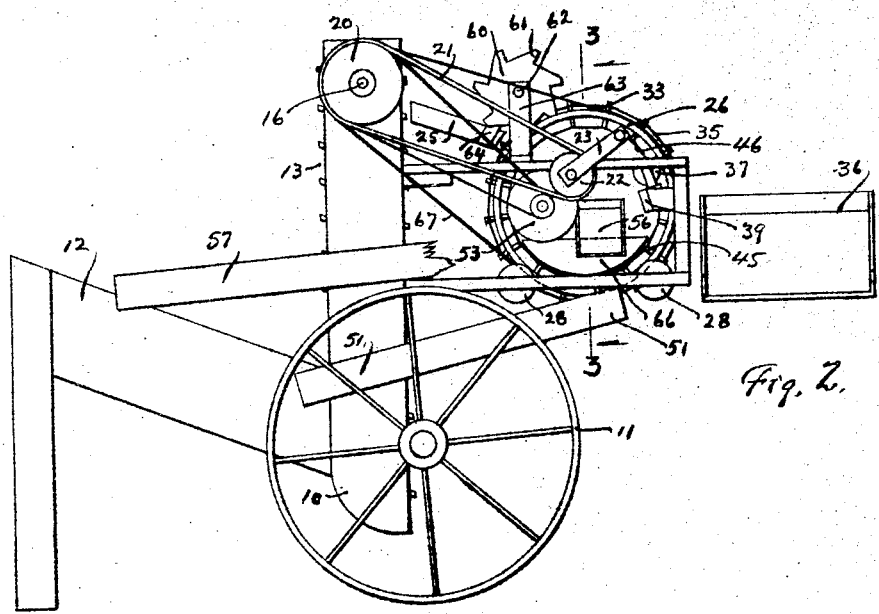
Fig. 2 is a side, sectional elevation of the same.

My device comprises a suitable frame 10 which is preferably mounted on wheels 11, whereby the device may be conveniently handled and moved from place to place. Arranged at the front end of the machine is a feed hopper 12 into which the fruit being sorted is placed. A fruit elevator 13 is arranged with its lower end at the bottom of the feed hopper 12 and the fruit is elevated by means of this elevator. The elevator is provided with a drum 15 at its upper end which is mounted upon the operating shaft 16 of the device, which is suitably journaled in the framework 10. The elevator comprises a plurality of slats 17 which are attached preferably to chains 18. These chains are suitably supported at their lower ends (not shown) in the framework 10. One end of the operating shaft 16 extends outwardly beyond the framework 10 and is provided with a sprocket wheel 20. This sprocket wheel is connected by means of the chain 21 to a sprocket 22. The sprocket 22 is suitably mounted for rotation and provided with a crank 23, whereby it may be operated.

Arranged on the discharge side of the elevator is a feed board 25, which catches the fruit coming from the elevator and directs it toward the grader cylinder 26. The feed board is provided with a plurality of parallel ridges 27, which direct the fruit in a number of defined paths and deliver it in proper position with respect to the grader cylinder.

The grader cylinder 26 is in the form of a drum and is open at both of its ends. It is suitably mounted for rotation upon a plurality of rollers 28. Flanges 29 on the rollers serve to keep the cylinder from moving endwise. The cylinder is provided with a series of apertures 30 over one portion of its surface, and with a series of smaller apertures 31 over the remaining portion of its surface. The feed board 25 is arranged to feed fruit onto the outside of the cylinder over the portion having the series of larger apertures 30, and the ridges 27 serve to direct the fruit into the apertures 30. As shown in the drawings, a number of apertures 30 are arranged longitudinally in a row, and a slat 33 is arranged longitudinal of the cylinder and between each of the rows of apertures. If desired, these slats may be grooved on the side which contacts with the fruit. A groove 34 is preferably arranged in each of the slats between each circumferential row of apertures, and cords 35 are extended circumferentially around the drum and lie in the grooves 34. This serves to form channels or pockets for the fruit, whereby it will be more readily centered over the apertures 30 in the cylinder.

The size of the apertures 30 is such that the first grade of apples or other articles being graded will not pass through them but will be conducted by the cylinder around to the opposite side thereof, where they will drop off of the cylinder and be discharged into a sorting table 36. The sorting table 36 is preferably inclined so that the fruit will be rolled to the lower end thereof so it may be disposed of in any suitable manner. Arranged on the side of the cylinder adjacent the sorting table 36 is an ejector roller 37. This roller is rotatably mounted upon the inside of the cylinder and is supported by means of a finger bar 38. The finger bar is supported by means of a longitudinally-arranged supporting bar 39, which extends clear through the cylinder and is suitably supported at each end by means of the framework of the machine. The roller 37 and finger bar 38 extend only through a portion of the cylinder having the apertures 30, the outer end of the roller and bar extending beyond the outer end of that portion of the cylinder. The ejector roller 37 is rotated by means of a belt 40, which passes over a pulley 41, carried by the operating shaft 16. This roller is arranged close to the inside of the cylinder, and serves to loosen any fruit which has become lodged in any of the apertures 30. Arranged upon the finger bar 38 are a plurality of ejector fingers 43, one arranged opposite each of the circumferential rows of apertures 30. The roller 37 releases any fruit which has become wedged in the apertures 30 by a rolling action, after which they are ejected by the fingers 43. Thus, the fruit is dislodged without bruising it in any way.

The apertures 31 in the grading cylinder are somewhat smaller than the apertures 30 and are of such a size that fruit which just passes through the apertures 30 will not pass through the apertures 31. These apertures are arranged in longitudinal and circumferential rows in a manner similar to the apertures 30, and a longitudinally-extending inner slat extends lengthwise between each longitudinal row of apertures 31 to the point in the cylinder where the apertures 31 stop. A plurality of cords or bands 46 are extending circumferentially around the cylinder on top of the inner slats 45, and thus serve to register the fruit with the apertures 31.

Figure 3:
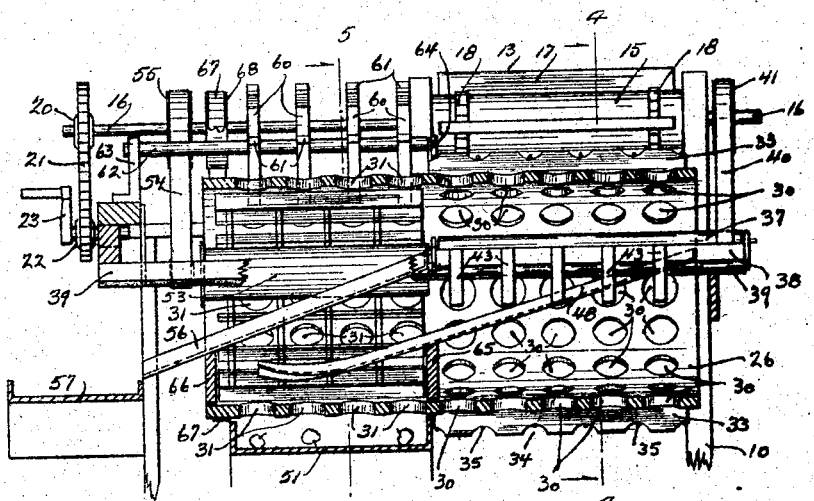
Fig. 3 is an enlarged sectional view taken on line 3—3 of Fig. 2.
Figure 4:
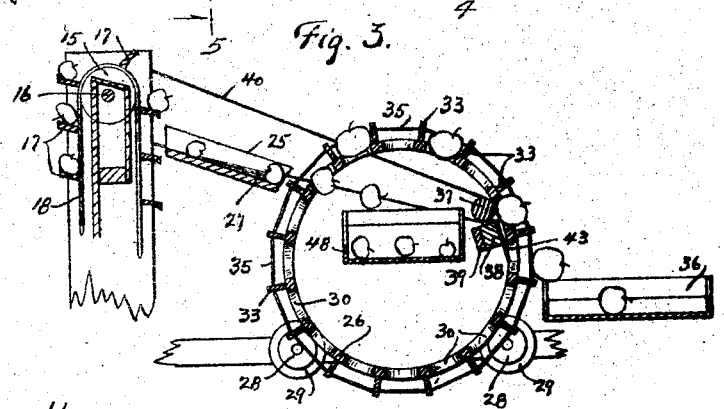
Fig. 4 is an enlarged, fragmentary, transverse, sectional elevation taken on line 4—4 of Fig. 3.
Figure 5:
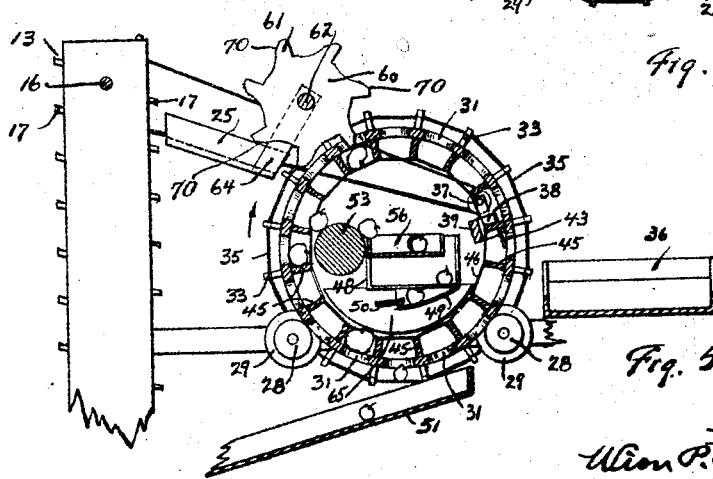
Fig. 5 is an enlarged, fragmentary, transverse, sectional elevation taken on line 5—5 of Fig. 3.

The fruit which is of such a size as to pass through the apertures 30 will be discharged into a feed chute 48, mounted longitudinally within the cylinder and inclined toward the part of the cylinder having the apertures 31. This chute is arranged to discharge its contents into the part of the cylinder having the apertures 31, and to this end it is provided with a curved outer portion 49, which is inclined and curved as shown in Figures 3 and 5, and preferably provided with a finger 50. The purpose of the inclination and the finger 50 is to serve to distribute the fruit evenly over the portion of the cylinder having the apertures 31. As the fruit is discharged into this portion of the cylinder, it will fall in between the cords or bands 46 and between the inner slats 45 and be brought into registering position with the apertures 31. All the inferior fruit which is smaller than the apertures 31 will immediately pass through these apertures, after being discharged from the chute 48, and be caught by a trough 51. This trough is inclined and the fruit may be discharged into a basket or barrel or otherwise disposed of as desired. All the fruit which does not pass through the apertures 31 will be conducted by means of the inner slats 45 upwardly along the side of the cylinder. The slats may be and are preferably grooved on the surfaces which convey the fruit so that it will be more firmly retained upon the slat. Arranged at a point about opposite the center line of the cylinder is a feed roller 53, which is suitably mounted for rotation within the cylinder and driven by means of a belt 54. The belt passes over a pulley 55 carried by the operating shaft 16. The peripheral speed of the feed roller 53 is greater than the peripheral speed of the grading cylinder, so as the fruit is reaching the horizontal center line of the cylinder, and as it is being rolled off of the slat 45, by reason of the increased inclination of the slat, it will be disposed upon the surface of the feed roller 53 and be carried over the upper side of the feed roller and deposited into a discharge chute 56. The discharge chute is inclined outwardly, and its outer end extends beyond the outer end of the cylinder, whereby the fruit deposited therein may be conducted to a sorting table or trough 57.

Arranged above the portion of the cylinder having the apertures 31 is a plurality of discharge cogs 60 which have teeth 61 engageable with the apertures 31. These cogs are mounted upon a shaft 62 and are rotated by reason of their engagement with the apertures 31. Each of the teeth 61 has a flattened surface 70 which approaches the grader cylinder 26 in a line tangent to the outer surface thereof, so that any fruit which becomes wedged in the apertures 31 will be gently forced out therefrom by contact with the flattened surfaces 70 of the cogs. Since the fruit is feed to the portion of the cylinder having the apertures 31 from the inside thereof, and since the discharge cogs 60 are arranged above the cylinder and on the outside thereof, there will be no possibility of catching the fruit between the cylinder and the teeth of the cogs, and thereby mutilating the same. The discharged fruit will drop onto the feed roll 53 or into the chute 56 and be conducted by this chute to the trough or feed table 57. The shaft 62, carrying the discharge cogs 60, is rotatably carried by a bracket 63 supported by the framework of the machine and by a bracket 64, supported preferably by the feed board 25.

As hereinbefore stated, the grading cylinder is mounted upon rollers 28, whereby it will be free to revolve. The cylinder is preferably rotated by means of a belt 67, which passes around one end of the cylinder and over a pulley 68 mounted upon the drive shaft 16.

Arranged at the bottom of the cylinder and supported by the chute 48 is a partition 65 which serves to prevent fruit from the portion of the cylinder having the apertures 31 from rolling into the portion of the cylinder having the apertures 30. A splash board 66 is arranged in the outer end of the cylinder at the end of the portion having the apertures 31, and it is supported preferably by means of the discharge chute 56.

From the foregoing it will be obvious that the fruit will be lifted from the feed board 25 by means of the slats 33 and all the fruit over a certain size will be carried around by the cylinder and discharged onto a sorting table 36. All the fruit which is under a certain size will pass through the apertures 30 and drop into the chute 48, and be conducted by this chute on the inside of the cylinder to the part of the cylinder having the apertures 31. The inferior fruit will pass through the apertures 31 and into the trough 51. All of the second grade fruit will be conducted by means of the slats 45 to the feed roller 53 and be discharged by the said roller into the discharge chute 56. This discharge chute will conduct it to the trough or sorting table 57.

For convenience of illustration, I have shown the apertures as having straight sides, but the edges which contact first with the fruit are preferably chamfered or rounded so as to form a better seat for the fruit and be less likely to injure the same.

These and other modifications of the details herein shown and described may be made without departing from the spirit of my invention or the scope of the appended claims, and I do not, therefore, wish to be limited to the exact embodiment herein shown and described.

Having thus described my invention, what I claim is:

1. A grading machine comprising a cylinder having a portion of its surface formed with a plurality of apertures of one size and another portion of its surface formed with a plurality of apertures of a different size, means for conducting fruit to the portion of the cylinder having the larger apertures, means for conducting the fruit which passes through the larger apertures to the portion of the cylinder having the smaller apertures, means for elevating the fruit in the portion of the cylinder having the smaller apertures, and means for discharging the fruit from the cylinder.

2. A grading machine comprising a grading cylinder, slats arranged longitudinally on the inside of the cylinder, and a feeding roller arranged adjacent the inner edges of the slats, whereby the fruit will be held on the slats as they are moving upwardly and conducted over the top of the feed roller into a chute.

3. A grading machine having a grading cylinder, a feed chute arranged within the cylinder to conduct fruit from one portion of the cylinder to another portion thereof, and a discharge chute arranged above the feed chute for conducting the fruit out of the second mentioned part of the cylinder.

4. A grading machine comprising a cylinder having a plurality of apertures formed in one portion of its surface and a plurality of longitudinally-arranged slats disposed between the longitudinal rows of apertures, the cylinder being formed with a plurality of relatively small apertures in another portion of its surface, a plurality of slats arranged on the inside of the cylinder and extending between the longitudinal rows of apertures formed in the last mentioned portion of the cylinder, and means for conducting the fruit which passes through the first mentioned apertures to the portion of the cylinder having the second mentioned apertures.

5. A grading machine comprising a rotatable grading cylinder having a plurality of apertures formed in its surface, a cylindrical ejector roller arranged close to the inside periphery of the cylinder, a finger bar arranged below the ejector roller, and a plurality of ejector fingers carried by the bar, whereby fruit which has become lodged in the apertures of the cylinder will be ejected.

6. A grading machine having a grading cylinder, a feed chute arranged within the cylinder to conduct fruit from one portion of the cylinder to another portion thereof, a discharge chute arranged above the feed chute for conducting the fruit out of the second part of the cylinder, and a splash board arranged at one end of the cylinder and beneath the discharge chute.

7. A grading machine comprising a rotatable grading cylinder, having a plurality of apertures formed in one portion of its surface, slats arranged between the longitudinal rows of apertures, cords carried by the slats and arranged between the longitudinal rows of apertures, the cylinder being also provided with a plurality of smaller apertures in another portion of its surface, slats arranged on the inside of the cylinder between longitudinal rows of apertures and cords carried by the slats and arranged between the circumferential rows of apertures, whereby pockets are formed for the fruit.

8. A grading machine comprising a rotatable grading cylinder, a plurality of apertures formed in one portion of the cylinder, a plurality of smaller openings formed in another portion of the cylinder, a feed chute arranged on the inside of the cylinder for conducting the fruit passing through the first series of apertures to the second portion of the cylinder, a discharge chute arranged inside of the cylinder for the fruit which does not pass through the second series of apertures, and a trough arranged outside of the cylinder for collecting the inferior fruit which passes through the apertures of the second portion of the cylinder.

9. A grading machine having a grading cylinder provided with a plurality of apertures formed in its surface, a feed chute arranged within the cylinder to conduct fruit from one portion of the cylinder to another portion thereof, an ejector roller arranged close to the inside periphery of the first mentioned portion of the cylinder, means for rotating the roller, and a discharge chute arranged above the feed chute for conducting the fruit out of the second mentioned portion of the cylinder.

10. A grading machine having a grading cylinder provided with a plurality of apertures formed in its surface, a feed chute arranged within the cylinder to conduct fruit from one portion of the cylinder to another portion thereof, an ejector roller arranged close to the inside periphery of the first mentioned portion of the cylinder, a finger bar arranged below the ejector roller, a plurality of ejector fingers carried by the bar, and a discharge chute arranged above the feed chute for conducting the fruit out of the second mentioned portion of the cylinder.

11. A grading machine having a grading cylinder provided with a plurality of apertures formed in its surface, a feed chute arranged within the cylinder to conduct fruit from one portion of the cylinder to another portion thereof, an ejector roller arranged close to the inside periphery of the first mentioned portion of the cylinder, a finger bar arranged below the ejector roller, a plurality of ejector fingers carried by the bar, a plurality of discharge cogs arranged on the outside of the cylinder for engaging the apertures of the second mentioned portion of the cylinder, and a discharge chute arranged above the feed chute for conducting the fruit out of the second mentioned portion of the cylinder.

12. A grading machine comprising a rotatable grading cylinder having a plurality of apertures formed in its surface, means for feeding fruit on the interior of the cylinder, and a plurality of discharge cogs arranged outside and above the cylinder for engagement with the apertures in the cylinder, each of the discharge cogs having a flattened surface which will assume a position tangent to the grading cylinder when it enters the apertures of the cylinder.

In testimony whereof, I have hereunto signed my name.

WION P. THOMAS.